Aug. 6, 1935.  T. B. MOREHOUSE  2,010,526
MOTOR CONTROL
Filed Jan. 25, 1932  3 Sheets-Sheet 1
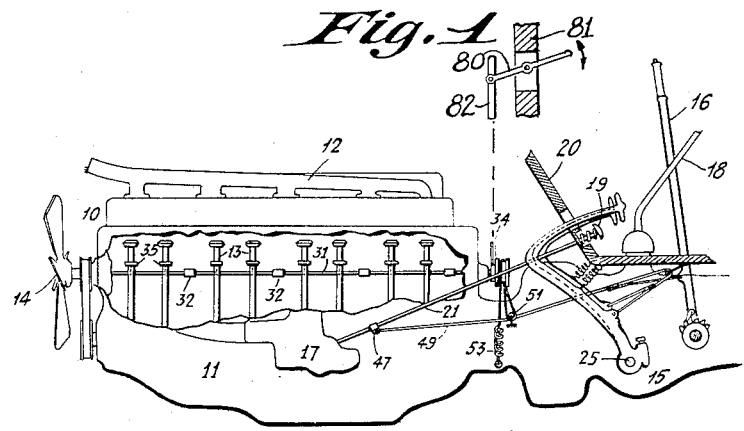
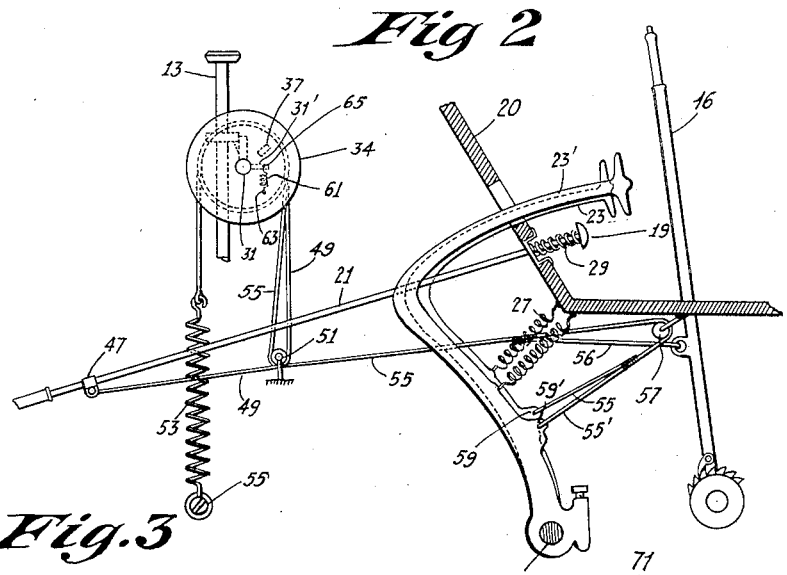
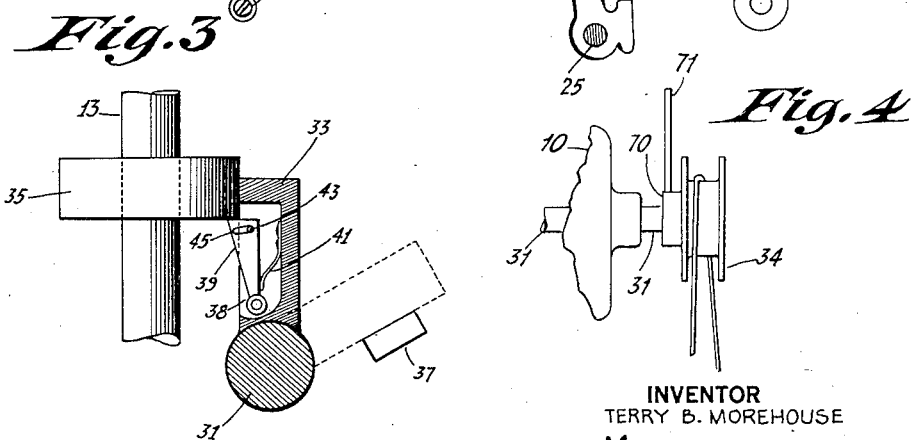
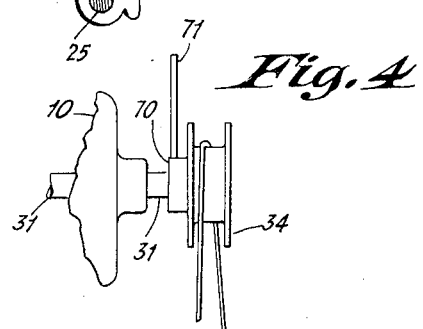
INVENTOR
TERRY B. MOREHOUSE
BY Frank S. Mistely
ATTORNEY Aug. 6, 1935. T. B. MOREHOUSE 2,010,526
MOTOR CONTROL
Filed Jan. 25, 1932 3 Sheets-Sheet 2

INVENTOR
TERRY B. MOREHOUSE
BY Frank S. Mistely
ATTORNEY

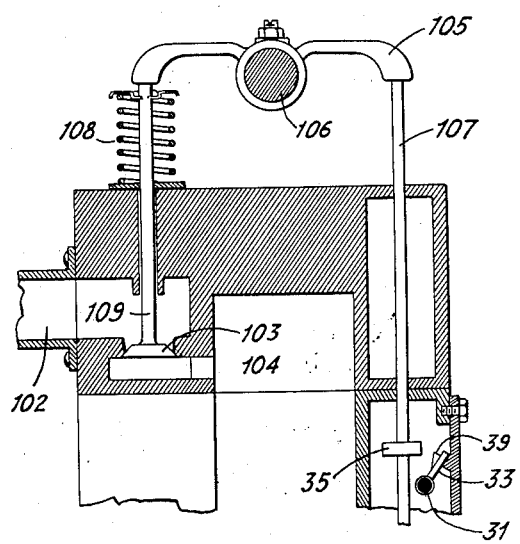
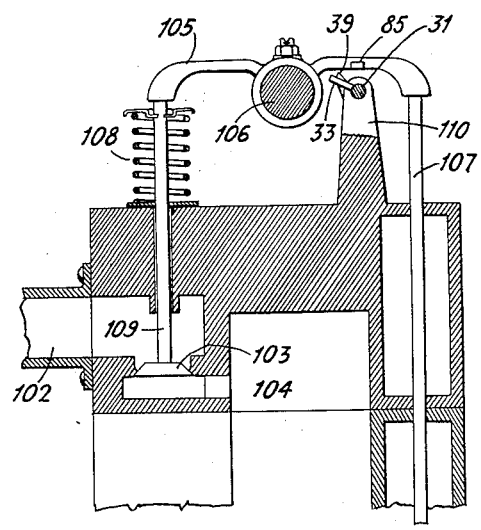
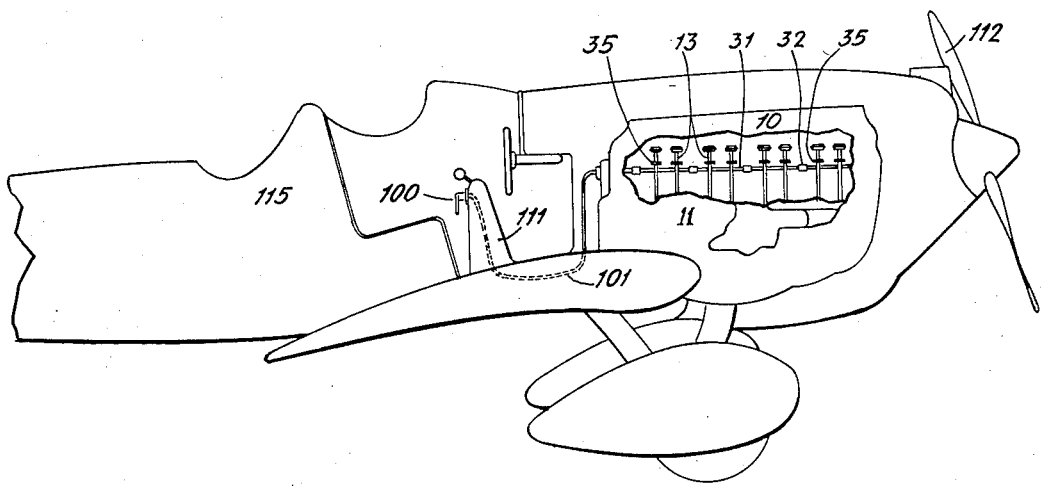

Patented Aug. 6, 1935

2,010,526

UNITED STATES PATENT OFFICE 2,010,526

MOTOR CONTROL

Terry B. Morehouse, West Hempstead, Long Island, N. Y., assignor of one-third to Frank S. Misterly, Lynbrook, N. Y.

Application January 25, 1932, Serial No. 588,744

5 Claims. (Cl. 192—.01)

This invention relates, broadly, to motor vehicles and more particularly to a novel motor control system.

In ordinary motor vehicles not provided with "free wheeling" arrangements, the motor and the driving wheels are connected to each other by means of the transmission and clutch mechanism. In this usual construction, unless the clutch is disengaged or the transmission placed in neutral, the rotation of the driving wheels and the rotation of the motor are coordinated and in the absence of any slip in the clutch mechanism the number of revolutions of one bears a fixed relation to the number of revolutions of the other for any particular gear ratio.

It follows, therefore, that when the engine is throttled down, the vehicle slows down a corresponding amount. Usually, the de-acceleration is rapid, due to the fact that the vehicle driving wheels drive the motor against the compression of the vapors in the engine cylinders and the suction effects in the intake manifold caused by the pumping of the engine at a greater rate than the throttle will permit the air gas vapors to be supplied. When this condition prevails, the engine acts as a brake. Under certain circumstances, as for instance, when the vehicle is traveling down a long steep grade, this braking action is very desirable, and it is sometimes even desirable to put the car into "gear" to increase the braking action. In general, however, the braking action of the engine is undesirable both from the standpoint of economy and comfort. This action is undesirable in that, in order to drive nicely it is necessary that the gas be regulated to prevent the engine from acting as a brake, resulting in unnecessary gas consumption. Improper manipulation of the accelerator causes jerking the car by the whipping of the transmission and results in a considerable wear upon the jack shaft and gears in general. This is one of the principal causes of wear in an automobile.

With the usual methods of "free wheeling", each time the accelerator is lifted, the engine slows down to its idling speed, and before the engine takes hold again, it is necessary that it be brought up to speed. This retarding and acceleration of the engine, which does no useful work in the moving of the car, represents direct fuel losses.

Also it is difficult to bring the engine up to full speed again without jerking the car as the engine takes hold resulting in unnecessary strain and wear upon the car and its transmission.

Furthermore, the fly-wheel effect of the engine may frequently exceed the momentum of the moving car, and therefore the inertia of the moving vehicle is considerably less with the ordinary "free wheeling" arrangement when the engine is slowed down. This results in a decrease in stability of the car when it is "free wheeling".

It is the object of the present invention to overcome each of the above-noted difficulties, or, more specifically, to provide a transmission system in which the momentum of the engine may be retained and one in which the retarding or braking effect thereof may be removed when desired.

It is a further object of the present invention to provide a transmission system in which the energy losses and other defects subsequent to obtaining a "free wheeling" effect in the usual manner shall be minimized.

Other objects of the invention will be apparent from the following specification when read in connection with the accompanying drawings, the novel features being pointed out in the claims following the description.

In accomplishing the objects of this invention, there are provided means for relieving the compression and suction of the engine when it is desired to obtain the "free wheeling" effect, and means for automatically controlling the said compression-relieving means as the car is operated in the usual manner.

More specifically, means are provided to co-act with valves in the cylinders, preferably the exhaust valves, although intake or auxiliary valves may be thus operated, to prevent compression and suction effects when it is desired to coast.

The valve control means, which preferably comprise removable detents arranged to co-act with the exhaust valves, are connected to be operated primarily by the accelerator pedal. Whenever the accelerator is pressed, the valve-opening mechanism is released, the valves operate in the usual fashion, and the engine acts in the normal manner. Whenever the accelerator is released, at which time the engine would normally slow down, the valves are held open and the engine is free to rotate.

For the effective operation of this device, it may be found important to provide extraordinarily large exhaust valves, although it is expected that for general purposes the present valves will be adequate. It is understood that the air from the cylinders will circulate back and forth from one cylinder to the other through the manifold, thus preventing loss of oil and obviating the necessity for a connection to the atmosphere while at the same time preventing unnecessary cooling of the engine. Lack of suction will prevent pumping gasolene mixture into exhaust line and lack of pressure will prevent blowing or backfiring into carburetor or intake manifold.

Interlocking control means are provided, connected to the foot brake, clutch and hand brake controls, so that actuation of either of these mechanisms will serve to release the valve mechanism, permitting the car to function in the normal manner, to prevent stalling when parking, etc., and also selective control means are provided to permit the braking effect of the engine to be obtained at will.

Having thus briefly described the elements composing the present invention, attention is invited to the accompanying drawings, in which:

Fig. 1 is a schematic representation of an eight-cylinder automobile engine including the exhaust valves with the present invention applied;

Fig. 2 is an enlarged schematic representation of the invention and controls;

Fig. 3 is a schematic detail view of the valve positioning means;

Fig. 4 is an enlarged schematic representation of a clutch device for allowing selective use of the invention;

Figs. 7 and 8 illustrate the invention applied to overhead valve type engines; and, Fig. 9 is a schematic representation of an airplane provided with an engine incorporating the present invention.

Figure 5:
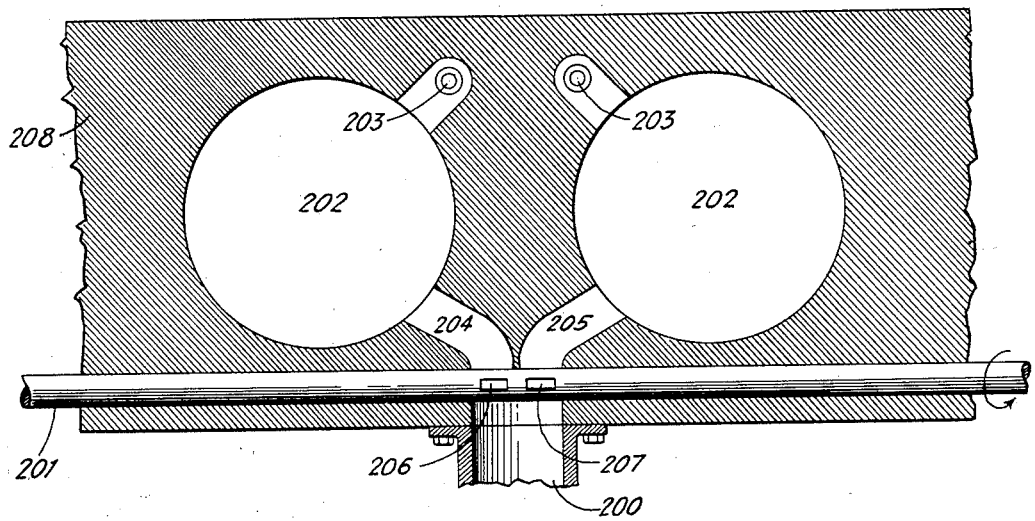
Fig. 5 is a schematic representation of a part of an engine showing an auxiliary manifold and valve control in accordance with the present invention.

Referring more particularly to the drawings, in which like reference numerals refer to corresponding parts in the several views, 10 designates, generally, an automobile engine comprising the crank-case 11, suitable cooling fluid paths 12, exhaust valve stems 13 of which, for the particular engine shown, there are eight, air cooling system 14, transmission casing 15, parking or emergency brake lever 16, carburetor 17, shifting lever 18, accelerator button 19, floor boards 20, and clutch and brake pedals 23' and 23 respectively.

The embodiment of the invention shown includes collars 35 placed around valve stems 13. The collars 35 may be attached to the valve stems in any suitable manner, or, if desired, they may be made as part of the valve stems.

A shaft 31 is provided with several bearings 32, arranged at proper intervals along its length, supported by the engine block in order to maintain the shaft axis fixed. The rear end of shaft 31, shown projecting through the rear of the engine block, is provided with a pulley device 34, connected thereto by means of a suitable clutch device 70 so that the shaft and pulley may be rotated as a unit when desired. For convenience, in Fig. 2 the shaft 31 and pulley 34 are shown as rotated horizontally 90° from the actual position as shown in Fig. 1.

Fixed to shaft 31 for cooperation with the valve stem collars 35 there are provided catch mechanism 33 (see Fig. 3) in a slot 38 in each of which is pivotally mounted a movable spring operated detent 39. Each detent 39 is provided with a slot 45 adapted to cooperate with a pin 43 attached to the sides of 33. The arrangement shown defines the movement of the detent 39 about its axis of rotation. A spring 41 is provided in order to always tend to force shoulder 39 to its extreme outward position.

Attention is here drawn to the fact that in Fig. 1 the catch mechanisms 33 are schematically represented by dotted lines drawn along the valve stems 13 at the appropriate places, the detents being in the rear of the valve stems as shown.

Since catch mechanisms 33 are fixed to shaft 31, any rotation of the shaft 31 will result in a proportional rotation of all of mechanisms 33. Stops 37, which may suitably be parts of the engine block, are provided to define the movement of shaft 31 in one direction. Movement of shaft 31 in the other direction is defined by catch mechanisms 33 abutting the collars 35 of the valve stems.

In the mechanism thus far described it will be seen that if shaft 31 is rotated clockwise (Figs. 2 and 3) so that mechanisms 33 rest against stops 37, the engine will operate in its customary manner. In other words, under these circumstances, the exhaust valve mechanism is not interfered with and the valves open and close their respective exhaust vents in customary fashion. When shaft 31 is rotated counter-clockwise and catches 33 abut their respective collars 35, collars 35 upon those valve stems which are open will rest upon their respective detents 39. The mechanism is so arranged that when collar 35 rests upon detent 39, the respective exhaust valve remains open. It is evident that should any valve be in any other position than substantially full open, when shaft 31 is rotated counter-clockwise, detent 39 will abut collar 35, with the result that it will be depressed against the force of spring 41 and no interference with the movement of stem 13 will be possible. However, when the valve of that particular stem 13 has moved to open valve position, collar 35 will have moved past detent 39, with the result that the detent 39 through the medium of spring 41 will snap out and prevent the said valve stem from further movement. When all the exhaust valves are thus held, the cylinders of the engine will be open to the exhaust manifold and the atmosphere, with the result that the engine may be turned easily without drawing fuel. If under these circumstances the engine is maintained connected to the driving wheels of the moving vehicle, the engine is turned by the wheels at a speed proportional to the vehicle speed and the engine and all moving parts tend to give the moving vehicle a fly-wheel effect. The moving vehicle under these circumstances would, so to speak, be coasting since no power is furnished by the motor. Furthermore, because of the fact that the cylinders are open to the atmosphere, or, more accurately, are not under alternate compression and suction, no fuel will be drawn into the cylinders and the engine will not act as a brake.

In order to control the valve mechanism for these conditions, a cable 49 is provided attached at one end to accelerator rod 21 at 47. The cable is passed around a pulley 51, over and around a pulley wheel 34, and the other end is attached to one end of coil spring 53. The other end of spring 53 is suitably attached to the engine block or the vehicle frame by appropriate means 55. Pulley 51 is attached to the engine block or the frame as desired.

The engagement of the cable 49 with the groove in pulley 34 is merely frictional and the parts are so proportioned that a comparatively slight motion of the rod 21 will serve to rotate the shaft 31 the amount required to cause the detents 39 to engage or disengage the collars 35. The arrangement is thus such that when the accelerator pedal 19 is depressed, cable 49 will rotate pulley wheel 34 in a clockwise direction, whereas if the accelerator pedal 19 is allowed to move toward its normal position through the action of spring 29, after it has been depressed, pulley wheel 34 will be rotated in a counterclockwise direction through the action of spring 53. Therefore, if the vehicle is in motion and the coasting action is desired, all that need be done is to allow the accelerator pedal 19 to move toward its normal position, or, in other words, to release pressure therefrom, after which, if it is desired to have the engine supply power again, the accelerator pedal is again depressed.

With the mechanism thus far described, the accelerator pedal must be depressed in order to operate the car normally. It follows therefore that should it be desired to stop the vehicle, reliance would have to be placed entirely upon the brakes, since the engine, with the arrangement thus far described, could not act as a brake. To correct this, a second cable 55 is provided which has one end attached to brake pedal 23 (shown behind clutch pedal 23') at 59. The cable is passed around a pulley 57 attached to floor boards 20 or to any suitable part of the frame, then around pulley 51 and is spliced to cable 49 before the latter passes around pulley 34. Thus, when the brake pedal 23 is depressed, pulley wheel 34 is rotated clockwise, with the result that interference with the valve mechanism is prevented; whereas, if the brake pedal pressure is released, the valves will again be held open.

In other words, if it is desired to stop or slow down the vehicle, the braking action of the engine may be enlisted by merely pressing the brake pedal. The engagement of cable 49 to which 55 is spliced with pulley wheel 34 is as before stated preferably frictional, and the distance between 59 and the common brake-clutch shaft 25 is so chosen that a very slight movement of the pedal, corresponding to the lost motion of the brake pedal, will actuate the valve release gear.

If the vehicle should be brought to a stop without the use of the brake pedal, it would be inconvenient to start the engine again because of the fact that all of the exhaust valves would be open. To correct this, any sort of release mechanism could be used operated by hand or automatically, as by depressing the starter button or the clutch pedal. Since when a vehicle is brought to a stop the clutch is disengaged in order to shift into neutral position, the releasing mechanism may be advantageously operated by the clutch pedal. For this purpose, cable 55 may be properly spliced and arranged to be operated by either clutch pedal 23' or brake pedal 23. As shown, the clutch pedal is also connected by cable 55' to cable 55 and to cable 49 and thus to the pulley 34. The arrangement is such also that a slight motion of the clutch pedal will actuate the valve release gear.

While driving a motor vehicle it sometimes happens that the emergency or parking brake lever is used to slow down, in which case it would be desirable, when operating the parking brake, to have the engine assume its normal conditions. Furthermore, to permit starting when clutch, foot brake and accelerator are idle, the cable 55 may be again spliced and a third cable 56 connected to the brake lever 16 as shown in Figs. 1 and 2. It follows that when the parking brake is applied by pulling lever 16 to the right (Figs. 1 and 2) pulley wheel 34 is rotated clockwise with the above described results.

The invention also provides means for rendering the system herein described selective at the driver's option. For this purpose pulley wheel 34 is attached to shaft 31 by means of a suitable selective clutch 70 provided with an operating lever 71 (see Fig. 4). Lever 71 and clutch mechanism 70 may be arranged so that when lever 71 is operated downwardly pulley wheel 34 and shaft 31 are engaged and when lever 71 is pulled upwardly the pulley wheel and shaft become disengaged thereby rendering the valve holding mechanism inoperative. Lever 71 may, through the use of suitable extensions such as 80, be operated from the instrument board 81 (see Fig. 1).

In case cable 49 should break, which would prevent revolving the pulley 34 clockwise, or should the operator disconnect the pulley wheel 34 from shaft 31 while the compression and suction actions are relieved, there is provided a spring having one end 65 attached to arm 31' secured to shaft 31 and its other end 63 attached to some part of the frame or engine block. The spring 61 is so arranged that if the engagement of wheel 34 and the cable is broken by reason of the breakage of spring 53 or of cable 49, the valve mechanism would be immediately restored to its normal operating condition.

Means may be provided connected to a position in front of the radiator which will permit retaining the valves open when cranking by hand. After a few turns of the engine under suction and compression to fill the cylinders with an explosive mixture, the release mechanism may be operated, the engine readily spun, and the mechanism released. The momentum of the engine will compress the gas in several cylinders to permit starting.

Figure 6:
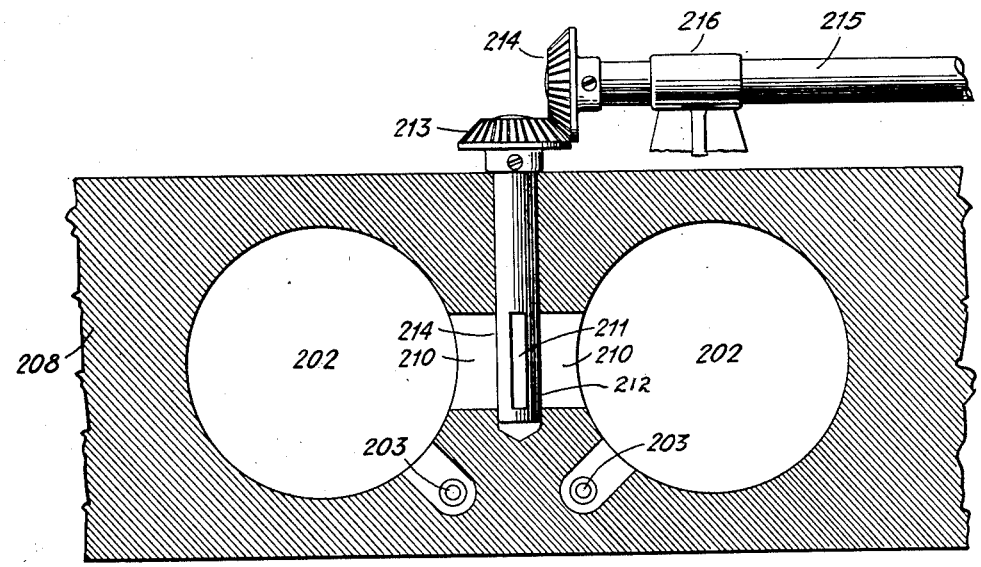
Fig. 6 illustrates an embodiment of the invention wherein a by-pass between cylinders is provided.

As above indicated, auxiliary compression release valves may be provided connected, if desired, by an auxiliary manifold (see Fig. 5), although a by-pass between adjacent cylinders would answer the purpose (see Fig. 6). These valves are operated in a convenient manner by means similar to those described above. Overhead valves may be operated by collars on the tappet rods as shown in Fig. 7, if desired, or by detents cooperating with the rocker arms as shown in Fig. 8.

In Fig. 5, two engine cylinders 202, 202 with the usual exhaust passages and valves 203 are shown as part of the engine block 208. By-passes 204, 205 connect each cylinder 202 with an auxiliary manifold 200 through a suitable valve arrangement such as rod 201 provided with passages 206 and 207. It is obvious that by rotating rod 201, 90° from the position shown in Fig. 5 there is provided a passage from the cylinders 202 to manifold 200. Rod 201 may be operated in the same manner as rod 31 of Fig. 1 or 9. In Fig. 6, two cylinders 202, 202 of an engine block 208 are shown provided with the usual exhaust passages and valves 203. An auxiliary valve controlled passage 210 is provided between the cylinders 202. A suitable valve mechanism may comprise a rotatable rod 212 provided with a slot 211 as shown. Rotation of rod 212, 90° from the position shown in Fig. 6 provides a connection between the two cylinders 202. Rod 212 may be rotated in any suitable manner such as by shaft 215 shown supported on bearing 216. Cooperation between shaft 215 and valve rod 212 is obtained as by gears 213, 214. It is obvious that with the piston of one cylinder 202 traveling upwardly and the piston of the other cylinder traveling downwardly, normal compression and suction actions of these two cylinders is practically eliminated with consequent elimination of braking action.

In Figs. 7 and 8 which show sections through an overhead valve motor the cylinder 104 is provided with the usual exhaust passage 102 and exhaust valve arrangement 103 and 109. The valve is controlled by the rocker arm 105 oscillating about shaft 106. The usual spring 108 is provided to normally hold the valve in its closed position. A tappet rod 107 operates the rocker arm in customary fashion. The mechanism for holding the exhaust valve open in Fig. 7 comprises a collar 35 attached to the tappet rod 107 and catch mechanism 33 (Figs. 3 and 7) provided with detent 39. The catch mechanism is operated by rotating shaft 31. In Fig. 8, rocker arm 105 is provided with a shoulder 85. The cooperating catch mechanism 33 provided with the detent 39 is supported on shaft 31 which in turn is supported by a series of bearing supports such as 110. It is obvious that when shaft 31 is rotated clockwise projection 85 will rest on the shoulder of detent 39 and hold the exhaust valve 103 open. The various shafts 31, 201 and 215 of the various embodiments may be rotated in any suitable manner, as for instance, in the manner shown in Figs. 1, 2 and 9.

While the invention has been described in connection with automobiles, it is to be distinctly understood that the principles involved are also applicable to any engine driven device. Of special importance is the application of the invention to aircraft. In such cases the valve controlling mechanism may be operated by means of the fuel feed regulator corresponding to the accelerator of the automobile, or it may be operated independently of the fuel feed regulator, that is, by a separate hand or foot controlled means, movement in one direction of which rotates shaft 31 so as to maintain the valves open and movement in the other direction restores the shaft so as to return the valves to their normal state. In case auxiliary valves are used their normal state would, of course, be in the closed position. In Fig. 9 an airplane 115 is provided with a motor 11 such as shown in Fig. 1. For producing the effects desired, shaft 31 is rotated by flexible driving means 101 and operating lever 100. Thus the valves may be controlled independently of the other mechanism. It can be seen that the application of the present invention to aircraft would enable a pilot to glide the craft for great distances by simply relieving the compression and suction actions of the engine and thereby eliminating the drag of the propeller. Thus if the engine should stall the pilot would be able to reach a distant landing field more readily.

Another important advantage resulting from the application of the invention to aircraft is that landing may be accomplished by relieving the compression and suction actions of the engine and gliding to earth. If it is desired to make a landing the engine would normally remain inactive, that is, the valves would remain open. Under these conditions the propeller would always be rotating at a speed corresponding to the air speed of the plane, therefore, should the pilot find it necessary to power drive the plane the valve holding mechanism would be disconnected and the proper amount of fuel feed supplied. The propeller at the instant the engine power is supplied would be rotating at the proper speed thereby eliminating strains and possible loss of control of the plane. The same advantages would, of course, be present should the pilot desire to alternately glide and power drive.

In particular it should be noted that by incorporating the present invention in aircraft, in contradistinction to the use of an overrunning clutch for eliminating propeller drag there results the advantage that the flywheel effect of the fixed propeller on the aircraft engine is not lost. Furthermore, the weight of the propeller would not have to be increased at all which is a distinct advantage in aircraft design. In the case of multi-engined craft use of the present invention greatly increases both the safety factor of the craft as well as the flying range thereof since if one engine dies its propeller would not constitute a drag on the others.

For instance, taking the case of two motored planes, if one of the required safety tests is that the plane must take off from one field and land at another field on one motor, it becomes perfectly obvious that with the present invention applied to the motor the resistance of the dead unit would be greatly decreased to the end that considerably smaller motors could be utilized than would otherwise be necessary to meet the condition of the above-mentioned test.

It is to be understood that the embodiment of this invention shown and described is for the purpose of illustration only and that the invention is not to be construed as limited thereby, but to be as set forth and defined in the following claims. It should also be understood that the various schematic illustrations of the drawings purposely omit all parts not necessary to a proper understanding of the invention. Where such parts are omitted it is to be understood that systems and arrangements such as now known to the art pertaining thereto are intended.

I claim:

1. In an automobile which includes an engine, a throttle control, and a clutch mechanism, the combination of means for relieving the compression and suction actions of said engine, means operative by said throttle control to operate said first-mentioned means when the throttle is moved in such a direction that the said actions would otherwise tend to retard the automobile, and means connected to said clutch mechanism to render said first-mentioned means inoperative when the clutch is moved in such a manner as to disengage said clutch mechanism.

2. In an automobile which includes an engine, a throttle control for said engine, a clutch mechanism and a brake, the combination therewith of means for relieving the compression and suction actions of said engine, means operative by said throttle control to operate said first-mentioned means when the latter is moved in such a direction that the said actions would otherwise act to retard the motion of said automobile, means connected to said clutch and means connected to said brake for independently rendering said first-mentioned means inoperative when either the clutch is operated to disengage said engine or said brake is operated to stop said automobile.

3. In an automobile which includes an engine, a throttle control for said engine, a clutch mechanism and a brake, the combination therewith of means for relieving the compression and suction actions of said engine, means, including a frictional engagment, operated by said throttle control to operate said first-mentioned means when the throttle is so operated that said actions would otherwise act to retard the motion of said automobile, means connected to said clutch for rendering said first-mentioned means inoperative when the clutch is moved in such a position as to disengage said engine, means connected to said brake to independently render said first-mentioned means inoperative when the brake is applied, and selective means for rendering said first-mentioned means inoperative when desired by the operator of said automobile.

4. In an automobile which includes an engine, a throttle control, a clutch, a service brake, and a hand brake, the combination of means for relieving the compression and suction actions of said engine, said means including means for retaining valves in the cylinder of said engine open, means connected to said throttle control for rendering said first means effective when said throttle control is moved in such a direction as to retard the motion of the car, and rendering said first-mentioned means ineffective when said throttle control is moved in such a direction as to accelerate the motion of the car, said last-mentioned means including a friction device whereby a continuance of motion of the throttle control in either direction is ineffective to further alter the effect of said first-mentioned means, independent means connected to said clutch, said hand brake, and said service brake, for rendering said second-mentioned means ineffective when said clutch is operated to disengage the engine, or when either of said brakes is operated.

5. In an automobile which includes an engine, a clutch, a throttle control, a service brake, and a hand brake, the combination of means for relieving the compression and suction of said engine, means connected to said throttle control whereby actuation of the latter will render said first-mentioned means operative whenever the operation is in such a direction as to decrease the speed of the automobile, and render said first-mentioned means ineffective whenever the operation of said throttle control is in such a direction as to increase the speed of the automobile, means connected to said clutch to render said first-mentioned means ineffective whenever said clutch is operated to disconnect the engine from said automobile, means connected to said service brake to render said first-mentioned means inoperative whenever said service brakes are applied, independent means connected to said hand brake for rendering said first-mentioned means ineffective whenever said hand brake is applied, and selective means operable by the driver of said automobile for rendering said first-mentioned means operable or inoperable by any of the latter-mentioned means.

TERRY B. MOREHOUSE.